United States Patent
Bachl et al.

(10) Patent No.: US 7,508,863 B2
(45) Date of Patent: Mar. 24, 2009

(54) METHOD OF PROCESSING MULTI-PATH SIGNALS

(75) Inventors: Rainer Walter Bachl, Nüremberg (DE); Robert Franz Klaus Kempf, Forchheim (DE); Markus Edmund Philipp, Erlangen (DE)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 549 days.

(21) Appl. No.: 11/009,026

(22) Filed: Dec. 13, 2004

(65) Prior Publication Data

US 2006/0126705 A1    Jun. 15, 2006

(51) Int. Cl.
 *H04B 1/00* (2006.01)
(52) U.S. Cl. ............... 375/148; 370/319; 370/320; 370/321; 370/330; 370/335; 370/342; 370/345; 342/150; 342/151; 342/153; 342/154; 342/155
(58) Field of Classification Search ............ 375/148, 375/150, 343
 See application file for complete search history.

(56) References Cited

U.S. PATENT DOCUMENTS

| | | | |
|---|---|---|---|
| 6,625,197 B1 * | 9/2003 | Lundby et al. | 375/130 |
| 6,975,172 B2 * | 12/2005 | Craynon et al. | 330/297 |
| 7,010,017 B2 * | 3/2006 | Lin | 375/147 |
| 7,221,722 B2 * | 5/2007 | Thomas et al. | 375/346 |
| 7,257,377 B2 * | 8/2007 | Malladi et al. | 455/65 |
| 2005/0069023 A1 * | 3/2005 | Bottomley et al. | 375/148 |
| 2005/0111528 A1 * | 5/2005 | Fulghum et al. | 375/148 |
| 2005/0271635 A1 * | 12/2005 | Kropp et al. | 424/93.7 |
| 2005/0276314 A1 * | 12/2005 | Dateki et al. | 375/148 |

* cited by examiner

*Primary Examiner*—Shuwang Liu
*Assistant Examiner*—Dhaval Patel

(57) ABSTRACT

In the method of processing signals, multi-path signals are received, channel estimates for the received multi-path signals are determined, and a combining operation is applied to the multi-path signals, the combining operation being a function of a correlation matrix of the received multi-path signals, a correlation matrix of estimates for channels of the received multi-path signals, a cross-correlation matrix of the channels and channel estimates for the received multi-path signals, and the channel estimates.

7 Claims, 2 Drawing Sheets

US 7,508,863 B2

METHOD OF PROCESSING MULTI-PATH SIGNALS

BACKGROUND OF THE INVENTION

1. Field of the Invention

The present invention relates generally to a method of processing multi-path signals, and more particularly to a method of processing multi-path signals including a combining operation.

2. Description of the Related Art

Conventional CDMA receivers typically include Rake receivers. Rake receivers ideally are filters matched to the channel impulse response. In practice, the channel impulse response is not known and an estimate for the channel must be used. The estimation of the channel includes estimation errors (e.g., errors in the signal, errors from noise, etc . . . ) which may cause performance degradation.

By conventional methods, the estimation of the frequency selective channel impulse response may be calculated as a superposition of flat fading multi-path signals. The flat fading multi-path signals may correspond to or be assigned to individual fingers of a conventional Rake receiver. The self-interference (i.e., interference to a multi-path signal from another multi-path signal) of multiple propagation paths may be reduced by the despreading operation of conventional CDMA systems.

By conventional methods, each finger of a Rake receiver requires an estimation and compensation of the fading channel response and the multi-path delay. The estimation of the channel may be performed with a low-pass filter and the multi-path delay may be determined with an early-late gate algorithm. In order to compensate for the flat fading channel, the overall delay for all Rake fingers is aligned and the conjugated channel estimates are multiplied with the received Rake finger signals.

Thus, the received signals are time-aligned and co-phased and may be combined with a simple summation; namely, a combining operation or a maximum ratio combining.

However, the maximum ratio combining operation typically assumes perfect channel knowledge. Alternatively, a more general approach employs imperfect channel estimates in the maximum ratio combining operation which includes channel estimation errors.

By conventional methods, when multi-paths are closely spaced, (e.g., spaced less than one chip period apart), the individual multi-paths cannot be resolved and the Rake fingers will lose synchronization with the multi-path signals on the propagation paths. Further, when the multi-path signals are closely spaced the Rake fingers will encounter a superposition of the multi-path signals.

SUMMARY OF THE INVENTION

An exemplary embodiment of the present invention is a method of processing signals that includes receiving multi-path signals, determining channel estimates for the received multi-path signals, and applying a combining operation to the multi-path signals to obtain a received signal. The combining operation may be a function of a correlation matrix of the received multi-path signals, a correlation matrix of estimates for channels of the received multi-path signals, and a cross-correlation matrix of the channels and channel estimates for the received multi-path signals.

Another exemplary embodiment of the present invention includes clusters of fingers assigned to one multi-path. Here, a cluster includes at least two fingers and each of the at least two fingers have a fixed offset from one another.

BRIEF DESCRIPTION OF THE DRAWINGS.

The present invention will become more fully understood from the detailed description given herein below and the accompanying drawings which are given by way of illustration only, wherein like reference numerals designate corresponding parts in the various drawings, and wherein.

DETAILED DESCRIPTION OF THE INVENTION

To better understand the present invention, examples of Rake receivers according to the present invention will be reviewed. This will be followed by an explanation of the derivation for the Log-Likelihood Ratio (LLR) according to the present invention. Then, an example implementation to obtain the LLR will be described.

RAKE RECEIVER EXAMPLE 1

Figure 1:
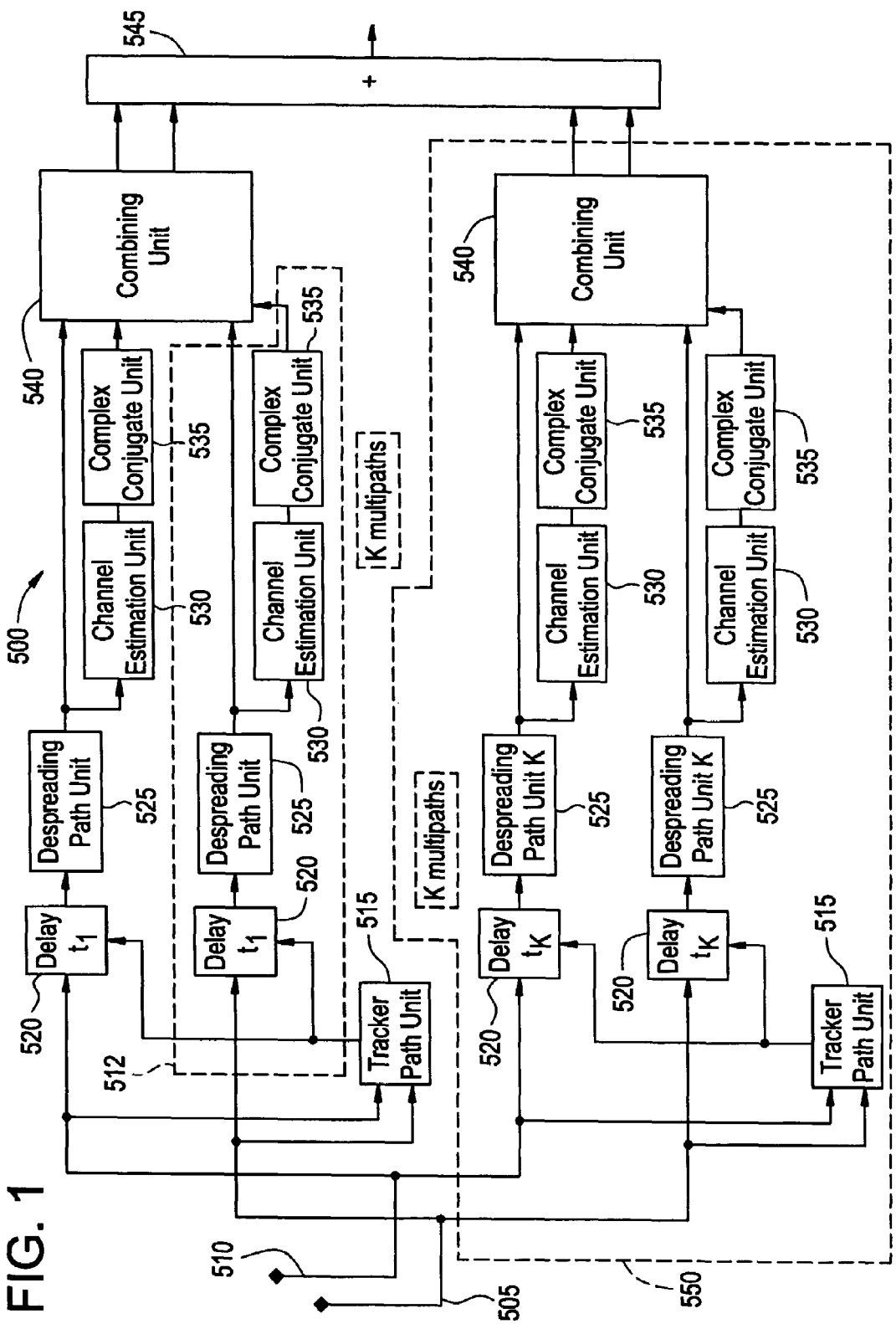
FIG. 1 illustrates a rake equalizer structure according to an exemplary embodiment of the present invention.

FIG. 1 illustrates a Rake equalizer structure 500 according to an exemplary embodiment of the present invention. The Rake equalizer structure 500 includes first antenna 505 and second antenna 510. The first and second antennas 505 and 510 are spaced apart from each other by half a wavelength (i.e., $\lambda/2$). It is understood, however, that any separation between first and second antennas 505/510 may be used (e.g., greater than $\lambda$, less than $\lambda/2$, etc . . . ).

The rake equalizer structure 500 may include a plurality of tracker path units 515 and delay units 520. In one embodiment, each of the delay units 520 is associated with a given Rake finger. The received antenna signals from each of the first and second antennas 505/510 are sent to corresponding tracker path units 515 and delay units 520.

The Rake equalizer structure 500 may include a plurality of clusters 550, each of the plurality of clusters 550 including a plurality of fingers 512 associated with each of the plurality of received antenna signals from antennas 505/510. Each of the tracker path units 515 designates a delay to be applied at each of the delay units 520. The delay units 520 delay the received antenna signals based on the delay received from the tracker path unit 515. Each delayed signal is output to the despreading path unit 525. Each of the despreading path units 525 despreads the delayed signal and outputs the despread signal to the combining unit 540 and a channel estimation unit 530. The channel estimation unit 530 outputs a channel estimate (e.g., denoted as $h_{est}$) based on the despread signal to a complex conjugate unit 535. The complex conjugate unit 535 receives the channel estimate and generates a complex conjugate of the channel estimate and outputs the complex conjugate to the combining unit 540.

Each of the plurality of clusters 550 may include a plurality of fingers as described above as well as a combining unit 540 for performing processing based on the correlation matrices of the signals. Exemplary methods of performing the combining operation for obtaining a log-likelihood ratio (LLR) computation will be described later.

The combining unit 540 performs processing on both the despread signal from the despreading path unit 525 and the complex conjugate of the channel estimate from the complex conjugate unit 535. The output of the combining unit 540 is received by a combiner 545.

In one embodiment, a correlation matrix is first multiplied with the vector of the despread signal from the despreading path unit 525 before multiplication with the complex conjugate of the channel estimate from the complex conjugate unit 535 and summation.

Alternatively, in another embodiment, a correlation matrix is first multiplied with the vector of the complex conjugate of the channel estimate from the complex conjugate unit 535 before multiplication with the despread signal from the despreading path unit 525 and summation. In either of the above-described embodiments, the LLR may be obtained with methods as will be discussed below.

RAKE RECEIVER EXAMPLE 2

Figure 2:
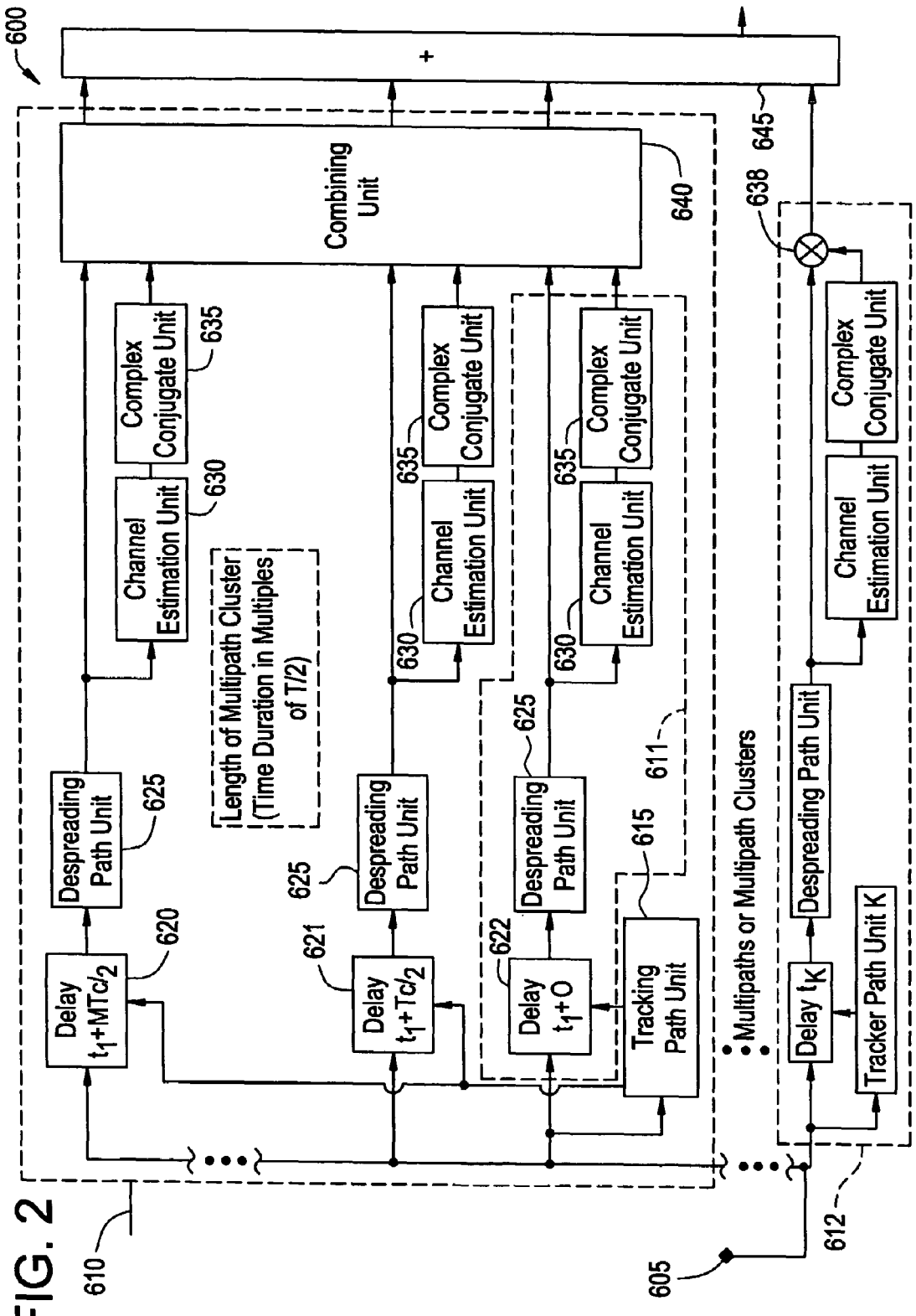
FIG. 2 illustrates a rake equalizer structure according to another exemplary embodiment of the present invention.

FIG. 2 illustrates a Rake equalizer structure 600 according to another exemplary embodiment of the present invention. Rake equalizer structure 600 includes a single antenna 605. The Rake equalizer structure includes a plurality of clusters 610, a first plurality of fingers 611 and a second plurality of fingers 612 (e.g., fingers which are not included within a cluster). Each of the plurality of clusters 610 includes a plurality of fingers 612. In one embodiment, a multi-path signal received by a cluster 610 is processed by all of the fingers 611 within the cluster 610. In another embodiment, a multi-path signal sent to a finger 612 not within a cluster is processed only by the finger 612. Each received multi-path signal is sent to either a finger 612 or a cluster 610.

When a multi-path signal is received at a finger 612 which is not within a cluster 610, the finger 612 may process signals in a similar manner as finger 512 as above-described with respect to FIG. 1. However, instead of entering a combining unit (e.g., combining unit 540, 640, etc . . . ), the finger 612 includes a multiplier 638 which simply multiplies the signal before being output to a combiner 645.

Alternatively, when a multi-path signal is received by one of the plurality of clusters 610, the received multi-path signal is offset by each of the fingers 612 within the cluster 610 by a fixed differential time. Referring to FIG. 2, each of the delay units 620/621/622 associated with a given finger 612 within the cluster 610 includes different total delays (e.g., $t_1+MT_c/2$, $t_1+T_c/2$, and $t_1$). The tracking path unit 615 designates the delay (i.e., $t_1$) associated with each of the delay units 620/621/622. The offset to the delay summed with the propagation delay equals the total delay. The offset is fixed for each of the fingers 611 within the cluster 610. In one embodiment, each of the offsets of the delay units 620/621/622 is less than a chip period (e.g., $\lambda/2$, $3/4\lambda$, etc . . . ). The number of fingers associated with a given cluster 610 may be based on a number of correlated multi-path signals. Also, the number of fingers within the cluster 610 is not limited to three as illustrated in FIG. 2. Rather, any number of fingers 611 may be included in the cluster 610.

After the fixed delays are inserted into the multi-path signal at delay units 620/621/622, the fingers of the cluster 610 perform operations on the delayed multi-path signals in a same manner as above-described with respect to finger 511 in FIG. 1. The combining unit 640 applies processing based on the signals' correlation matrices to the delayed multi-path signals. Exemplary methods of performing the combining operation for obtaining the LLR computation will be described later. The output of the combining unit 640 is received by a combiner 645.

In one embodiment, similar to the above-described combining unit 540, with respect to the combining unit 640, a correlation matrix is first multiplied with the vector of the despread signal from the despreading path unit 625 before multiplication with the complex conjugate of the channel estimate from the complex conjugate unit 635 and summation.

Alternatively, in another embodiment, a correlation matrix is first multiplied with the vector of the complex conjugate of the channel estimate from the complex conjugate unit 635 before multiplication with the despread signal from the despreading path unit 625 and summation. In either of the above-described embodiments, the LLR may be obtained with methods as will be discussed below.

EXAMPLE DERIVATION OF THE LLR

An example of a derivation of the LLR will now be described. After timing alignment and despreading, the received signals for L Rake fingers at a given time may be represented in a vector by $$r_a = \begin{bmatrix} r_1 \\ r_2 \\ \vdots \\ r_L \end{bmatrix} = a \begin{bmatrix} h_1 \\ h_2 \\ \vdots \\ h_L \end{bmatrix} + \begin{bmatrix} n_1 \\ n_2 \\ \vdots \\ n_L \end{bmatrix} = ah + n \quad (2.1)$$

where $r_a$ is the received signal vector, $r_a$ denotes the received signal for the kth Rake finger, $h_k$ denotes the complex-valued fading coefficients of the multi-path channel, $n_k$ denotes the complex-valued additive noise received in each Rake finger and $\alpha$ denotes the symbol transmitted. For simplicity, in this example, a Binary Phase Shift Keying (BPSK) modulation will be considered whereby $\alpha \in \{-1, +1\}$. An observed effective channel coefficient vector $h_{\mathit{eff}}$ for the data demodulated signal may be given by $$h_{\mathit{eff}} = \alpha r = h + \alpha n = h + n_{\mathit{eff}} \quad (2.2)$$

where the effective noise $n_{\mathit{eff}}$ and the original noise process n have the same statistical properties. The fading coefficients can be estimated based on blind channel estimation methods, data and/or pilot aided channel estimation methods. The channel estimates may be then expressed as $$h_{est} = \gamma h + n_{est} \quad (2.3)$$

where $h_{est}$ is the channel estimate, $\gamma$ is a scaling factor, and $n_{est}$ is the estimation error. The computation of the LLR may define the optimum combining rule for the individual Rake finger signals. For Gaussian distributed signals, the LLR may be expressed as a quadratic function of the channel estimates and the received signals as shown below in Expression 3.1.

$$LLR = \begin{bmatrix} r_a \\ h_{est} \end{bmatrix}^H (R_{a=-1}^{-1} - R_{a=1}^{-1}) \begin{bmatrix} r_a \\ h_{est} \end{bmatrix} \quad (3.1)$$

where $(.)^H$ denotes complex conjugate transposition and the correlation matrix $R_a$ conditioned on the transmitted symbol $\alpha$ is given by $$R_a = E\left\{ \begin{bmatrix} r_a \\ h_{est} \end{bmatrix} \begin{bmatrix} r_a \\ h_{est} \end{bmatrix}^H \right\} = \qquad (3.2)$$

$$\begin{bmatrix} E\{r_a r_a^H\} & E\{r_a h_{est}^H\} \\ E\{h_{est} r_a^H\} & E\{h h_{est}^H\} \end{bmatrix} = \begin{bmatrix} R_{r,r} & aR_{h_{eff},h_{est}} \\ aR_{h_{eff},h_{est}}^H & R_{h_{est},h_{est}} \end{bmatrix}$$

where $E\{.\}$ denotes the expectation operator. $R_{r,r}$, $R_{hest,hest}$, and $R_{heff,hest}$ will be described later. Expression 3.2 represents a correlation matrix, the inverse of which is shown below in Expression 3.3

$$R_a^{-1} = \begin{bmatrix} \left(R_{r,r} - R_{h_{eff},h_{est}} R_{h_{est},h_{est}}^{-1} R_{h_{eff},h_{est}}^H\right)^{-1} & a\left(R_{h_{eff},h_{est}}^H - R_{h_{est},h_{est}} R_{h_{eff},h_{est}}^{-1} R_{r,r}\right)^{-1} \\ a\left(R_{h_{eff},h_{est}} - R_{r,r} R_{h_{eff},h_{est}}^{-H} R_{h_{est},h_{est}}\right)^{-1} & \left(R_{h_{est},h_{est}} - R_{h_{eff},h_{est}}^H R_{r,r}^{-1} R_{h_{eff}},h_{est}\right)^{-1} \end{bmatrix} \quad (3.3)$$

The difference of the correlation matrices in the computation of the LLR may be expressed as $$R_{a=-1}^{-1} - R_{a=1}^{-1} = \begin{bmatrix} 0 & 2\left(R_{h_{est},h_{est}} R_{h_{eff},h_{est}}^{-1} R_{r,r} - R_{h_{eff},h_{est}}^H\right)^{-1} \\ 2\left(R_{r,r} R_{h_{eff},h_{est}}^{-H} R_{h_{est},h_{est}} - R_{h_{eff},h_{est}}\right)^{-1} & 0 \end{bmatrix} \quad (3.4)$$

where only the diagonal elements of the matrices are non-zero. By inserting Expression 3.4 into Expression 3.1 we obtain the LLR as $$LLR = 4\Re\{h_{est}^H (R_{r,r} R_{h_{eff},h_{est}}^{-H} R_{h_{est},h_{est}} - R_{h_{eff},h_{est}})^{-1} r\} \quad (3.5)$$

$$= 4\Re\{h_{est}^H Y r\}$$

Expression 3.5 defines the equalization function for the received signals (e.g., Rake finger signals). Since the correlation matrices may be slowly time varying, the matrix Y in Expression 3.5 may be slowly time-varying. Therefore, the evaluation of matrix Y in Expression 3.5 may require infrequent updating. Thus, the computation of the matrix Y in Expression 3.5 may be performed separate from the fast fading channel estimation. In an example, the correlation matrix processing units 540/640 of FIGS. 1 and 2 illustrate structures wherein the Expression 3.5 may be applied to a single multipath, cluster.

The matrix Y may be computed from correlation matrices of the channel, the noise and the channel estimates. These correlation matrices correspond to second order statistics that are usually constant or slowly time varying. The correlation matrices are often known in practice or they can be estimated with a high level of accuracy.

Further, it is understood that the matrix Y may be used in either pre-processing the received signals by computing $p=Yr_\alpha$ (i.e., applying matrix multiplication to the despread signal) or pre-processing the channel estimates by computing $q=Y^H h_{est}$ (i.e., applying matrix multiplication to the output from the channel estimation unit 530/630, before combining the received signals in an optimum way by forming an inner product $h^H_{est} p$ or $q^H r_\alpha$.

In the case that there are no correlations among the received signals, the noise processes and the channel estimates, then the correlation matrices are diagonal matrices with non-zero values at the main diagonal only. Hence, the matrix Y becomes a diagonal matrix and the optimum combining rule reduces to a scaling of every signal path and a summing of the signals thus obtained.

PROPERTIES OF THE CORRELATION MATRICES

While Expression 3.5 defines a general combining rule (e.g., a Rake finger combining rule), simplifications of the computation of the LLR will now be described.

Received Signal Correlattion: $R_{r,r}$

The channel coefficients and the noise are often uncorrelated, i.e. $E\{h_k n^*j\}=0$, $k=1,2\ldots L$, $j=1,2\ldots L$. Therefore, the received signal correlation matrix can be separated into a sum of two correlation matrices as given by $$R_{r,r} = R_{h_{eff},h_{eff}} = R_{h,h} + R_{n,n} \quad (4.1)$$

The noise samples are often uncorrelated which causes a noise correlation matrix $R_{n,n}=E\{n \, n^H\}$ to be diagonal. The channel correlation matrix $R_{h,h}=E\{h \, h^H\}$ may often be assumed to be a sparse matrix with entries only around the main diagonal because the correlation of channel coefficients separated by more than a single chip period may be reduced by the despreading operation.

Channel Estimate Correlation: $R_{hest,hest}$

The results from channel estimation can be scaled such that the channel estimates become unbiased, i.e. $E\{h_k n^*_{est,k}\}=0$, $k=1,2\ldots L$. The condition for unbiased channel estimates may imply that $E\{h_k n^*_{est,j}\}=0$, $k\neq j$, $k=1,2\ldots L$, $j=1,2\ldots L$. Therefore, the channel estimate correlation matrix can be separated into a sum of two correlation matrices as given by $$R_{hest,hest} = \gamma^2 R_{h,h} + R_{nest,nest} \quad (4.2)$$

whereby the estimation error correlation matrix $R_{nest,nest}$ is diagonal if the noise correlation matrix is diagonal.

Cross Correlation of Channel and Channel Estimate: $R_{heff,hest}$

Assuming that channel estimates are unbiased and that there is no correlation between channel and noise processes, the cross correlation of channel and channel estimate can be separated into a sum of two matrices as given by $$R_{h_{eff},h_{est}} = \gamma R_{h,h} + R_{n_{eff},n_{est}} \quad (4.3)$$

whereby the cross correlation matrix between effective noise and channel estimation error $R_{neff,nest} = E\{n_{eff} n^H_{est}\}$ is diagonal if the noise correlation matrix is diagonal as well. Further, in another example, when a pilot signal and data are transmitted by independent channels separated either in time, in frequency, by different codes or by different quadrature components, the effective noise and the channel estimation error are also uncorrelated, which renders the second matrix at the right hand side of Expression 4.3 to be zero.

Estimation of the Correlation Matrices

It may be noted that the correlation matrices from Expressions 4.1, 4.2 and 4.3 which may be used to compute the LLR in Expression 3.5 may be estimated based on the received signals and the channel estimates from the Rake fingers. There are many well-known methods to estimate and refine the relevant correlation matrices. One example method is based on the sample correlations for a given sample size of N, where the correlation matrices are approximated by $$R_{r,r} \approx \frac{1}{N} \sum_{n=1}^{N} r_a(n) r_a^H(n),$$

$$R_{h_{est},h_{est}} \approx \frac{1}{N} \sum_{n=1}^{N} h_{est}(n) h_{est}^H(n),$$

$$R_{h_{eff},h_{est}} \approx \frac{1}{N} \sum_{n=1}^{N} a(n) r_a(n) h_{est}^H(n),$$

(4.4, 4.5, 4.6)

with the discrete time index n. As discussed above, the properties of the correlation matrices may be used to reduce computational requirements and improve the accuracy of the correlation matrix estimation. For example, if the matrix is known to be banded or diagonal only the non-zero entries in the matrix require computation.

EXAMPLE OF LLR IMPLEMENTATION

An example implementation to obtain the LLR will now be given. In this example, it is assumed that two uncorrelated multi-paths are received. It is further assumed that a first multi-path has an energy of "1" and a second multi-path has an energy of "2", the energy values corresponding to a signal strength level, which may be given as $$R_{h,h} = \begin{bmatrix} 1 & 0 \\ 0 & 2 \end{bmatrix} \quad (5.1)$$

It may also be assumed that the noise is the same in both of the received multi-path signals, the noise is uncorrelated between the two multi-path signals and the variance of the noise is 1; namely, $$R_{n,n} = R_{n_{eff},n_{eff}} = \begin{bmatrix} 1 & 0 \\ 0 & 1 \end{bmatrix}. \quad (5.2)$$

It may be further assumed that the channel estimation works better for the stronger path (i.e., the second multi-path including an energy of "2") with an estimation error variance of 0.25, but for the weaker path (i.e., the first multi-path) there is an estimation error variance of 1. If the channel estimation yields uncorrelated estimation errors, then $$R_{n_{est},n_{est}} = \begin{bmatrix} 1 & 0 \\ 0 & 0.25 \end{bmatrix}. \quad (5.3)$$

It may be further assumed that the channel h and the noise in the received signal n are uncorrelated; namely, $$R_{r,r} = R_{h,h} + R_{n,n} = R_{h,h} + R_{n_{eff},n_{eff}} = \begin{bmatrix} 1 & 0 \\ 0 & 2 \end{bmatrix} + \begin{bmatrix} 1 & 0 \\ 0 & 1 \end{bmatrix} = \begin{bmatrix} 2 & 0 \\ 0 & 3 \end{bmatrix} \quad (5.4)$$

It may be further assumed that the estimated channel $h_{est}$ and the estimation error nest are uncorrelated; namely, $$R_{h_{est},h_{est}} = R_{h,h} + R_{n_{est},n_{est}} = \begin{bmatrix} 1 & 0 \\ 0 & 2 \end{bmatrix} + \begin{bmatrix} 1 & 0 \\ 0 & 0.25 \end{bmatrix} = \begin{bmatrix} 2 & 0 \\ 0 & 2.25 \end{bmatrix} \quad (5.5)$$

It may be further assumed that the estimation error $n_{est}$ and the channel h are uncorrelated; namely, $$R_{h_{eff},h_{est}} = R_{h,h} = \begin{bmatrix} 1 & 0 \\ 0 & 2 \end{bmatrix} \quad (5.6)$$

Given the above assumptions, sufficient information is known to calculate the optimum path combining function.

Computation of the Matrix Y

Next, expression 5.6 must be complex conjugate transposed, which is denoted by $$R_{h_{eff},h_{est}}^H = (R_{h_{eff},h_{est}})^H = ((R_{h_{eff},h_{est}})^T)^* \quad (5.7)$$

where $(.)^H$ is a complex conjugate transposition, $(.)^T$ is the matrix transpose, and $(.)^*$ is complex conjugation. Since the matrix in expression 5.6 may include only real values (i.e., not imaginary values), the resultant matrix in Expression 5.7 is identical with its complex conjugate matrix; namely, $$((R_{h_{eff},h_{est}})^T)^* = (R_{h_{eff},h_{est}})^T \quad (5.8)$$

Since the matrix in Expression 5.6 includes non-zero elements at the main diagonal only, the matrix is identical with its transposed matrix, i.e.

$$(R_{h_{eff},h_{est}})^T = R_{h_{eff},h_{est}} \quad (5.9)$$

Substituting expressions 5.9 and 5.8 into 5.7 results in $$R_{h_{eff},h_{est}}^H = R_{h_{eff},h_{est}} \quad (5.10)$$

The inverse of expression 5.10 is given by $$R_{h_{eff},h_{est}}^{-H} = (R_{h_{eff},h_{est}}^{H})^{-1} = (R_{h_{eff},h_{est}})^{-1} = \begin{bmatrix} 1 & 0 \\ 0 & 0.5 \end{bmatrix} \quad (5.11)$$

and is required in the computation of matrix Y. Sufficient information is given in this example to complete the computation of matrix Y. Expression 5.12 given below illustrates the steps of computing matrix Y.

$$Y = (R_{r,r} R_{h_{eff},h_{est}}^{-H} R_{h_{est},h_{est}} - R_{h_{eff},h_{est}})^{-1} \quad (5.12)$$

$$= \left( \begin{bmatrix} 2 & 0 \\ 0 & 3 \end{bmatrix} \begin{bmatrix} 1 & 0 \\ 0 & 0.5 \end{bmatrix} \begin{bmatrix} 1 & 0 \\ 0 & 2.25 \end{bmatrix} - \begin{bmatrix} 1 & 0 \\ 0 & 2 \end{bmatrix} \right)^{-1}$$

$$= \left( \begin{bmatrix} 2 & 0 \\ 0 & 3.375 \end{bmatrix} - \begin{bmatrix} 1 & 0 \\ 0 & 2 \end{bmatrix} \right)^{-1}$$

$$= \left( \begin{bmatrix} 1 & 0 \\ 0 & 1.375 \end{bmatrix} \right)^{-1}$$

$$= \begin{bmatrix} 1 & 0 \\ 0 & \frac{1}{1.375} \end{bmatrix} \approx \begin{bmatrix} 1 & 0 \\ 0 & 0.727272 \end{bmatrix}.$$

In this example, as described above in Expression 3.5, the LLR may be computed as $$LLR = 4\Re\{h_{est}^H Y r\} = 4\Re\left\{ h_{est}^H \begin{bmatrix} 1 & 0 \\ 0 & \frac{1}{1.375} \end{bmatrix} r \right\}, \quad (5.13)$$

where $\Re\{.\}$ corresponds to the real part (i.e., excluding the imaginary part) of the LLR. Numeric values are not given for r and $h_{est}$ since these values typically change rapidly. In contrast, numeric values are given for the matrix Y since the values for the matrix Y are generally constant or slow changing.

The vectors for r and $h_{est}$ may be given as $$r = \begin{bmatrix} r_1 \\ r_2 \end{bmatrix} = \begin{bmatrix} \Re\{r_1\} + i\Im\{r_1\} \\ \Re\{r_2\} + i\Im\{r_2\} \end{bmatrix} \quad (5.14, 5.15)$$

$$h_{est} = \begin{bmatrix} h_{est1} \\ h_{est2} \end{bmatrix} = \begin{bmatrix} \Re\{h_{est1}\} + i\Im\{h_{est1}\} \\ \Re\{h_{est2}\} + i\Im\{h_{est2}\} \end{bmatrix}$$

where $\Re\{.\}$ is again the real part of the expression, $\Im\{.\}$ is the imaginary part of the expression, and $i=\sqrt{(-1)}$ (i.e., i being the square root of negative one) is the imaginary unit. The complex conjugate transposed channel estimate vector is then given by $$h_{est}^H = (h_{est}^*)^T = [h_{est1}^* \; h_{est2}^*] = [\Re\{h_{est1}\} - i\Im\{h_{est1}\} \\ \Re\{h_{est2}\} - i\Im\{h_{est2}\}] \quad (5.16)$$

where $(.)^H$ is complex conjugate transposition, $(.)^T$ is the transposed, and $(.)^*$ is complex conjugation.

With expressions 5.14, 5.15 and 5.16, the LLR may be rewritten as $$LLR = 4\Re\left\{ [h_{est1}^* \; h_{est2}^*] \begin{bmatrix} 1 & 0 \\ 0 & \frac{1}{1.375} \end{bmatrix} \begin{bmatrix} r_1 \\ r_2 \end{bmatrix} \right\} \quad (5.17)$$

$$= 4\Re\left\{ h_{est1}^* r_1 + \frac{1}{1.375} h_{est2}^* r_2 \right\}$$

Combining weights or weighting functions [w1 w2] for the individual multi-path received signals r1, r2 may be given as $$[w_1 \; w_2] = h_{est}^H Y = [h_{est1}^* \; h_{est2}^*] \begin{bmatrix} 1 & 0 \\ 0 & \frac{1}{1.375} \end{bmatrix} = \left[ h_{est1}^* \; \frac{1}{1.375} h_{est2}^* \right] \quad (5.18)$$

The LLR may be expressed as a function of the real and imaginary components as shown below in Expression 5.19.

$$LLR = 4\Re\left\{ h_{est1}^* r_1 + \frac{1}{1.375} h_{est2}^* r_2 \right\} = \quad (5.19)$$

$$4\Re\{(\Re\{h_{est1}\} - i\Im\{h_{est1}\})(\Re\{r_1\} + i\Im\{r_1\}) +$$

$$\frac{1}{1.375}(\Re\{h_{est2}\} - i\Im\{h_{est2}\})(\Re\{r_2\} + i\Im\{r_2\})\} =$$

$$4\Re\{h_{est1}\}\Re\{r_1\} + 4\Im\{h_{est1}\}\Im\{r_1\} + \frac{4}{1.375}\Re\{h_{est2}\}\Re\{r_2\} +$$

$$\frac{4}{1.375}\Im\{h_{est2}\}\Im\{r_2\}$$

Thus, in the above example including only two uncorrelated paths, the optimum combining function may be calculated using the above-described method.

EXAMPLE APPLICATIONS OF THE PRESENT INVENTION

The exemplary embodiments of the present invention being thus described, it will be obvious that the same may be varied in many ways. While above-described embodiments have been directed to Rake receivers, the exemplary embodiments may be applied to a single input—multiple output system (SIMO). In an embodiment where the channel is perfectly known (i.e., no estimates are required) and no correlations among the input signals exist, the exemplary embodiments of the present invention may reduce to a well-known maximum ratio combining solution.

The optimum combining rule according to exemplary embodiments of the present invention may be applied to systems including SIMO systems whereby the multiple outputs are used in a receiver either as a continuous time or discrete time signal. Specific applications may include, but are not limited to, signal processing of acoustic signals sampled from a microphone array in a noisy environment, mechanical sensor systems for tension, torsion, acceleration, optical sensor systems, etc. . . .

Other applications may include radio frequency (RF) signals received with a single antenna, multiple antennas (e.g., an antenna array) and/or processed with a Rake receiver. One difference between the application of the exemplary embodiments applied to RF receivers and other receivers with optical, mechanical and/or acoustic sensors is the use of complex valued equivalent base-band signals for RF reception versus real valued signals for alternative systems.

Generally, exemplary embodiments of the present invention describe the optimum combining rule for a SIMO system wherein the following conditions are met:

A) the channel is unknown and requires estimation.
B) the channel may be described by an equivalent multidimensional zero mean Gaussian distributed process
C) the information transmitted may be represented by antipodal signaling (e.g., 1, −1)

Condition A) is typical in most communication scenarios (e.g., RF, acoustic systems, optical systems, etc . . . ).

Condition B) is a restriction to certain types of channels. The channels restricted to may include channels typically encountered when transversal waves are transmitted (e.g., in RF communications, optical communications, etc . . . ). The channels may also include channels for transmission of longitudinal waves (e.g., acoustic communications, underwater communications).

Condition C) is another restriction on the way the information is represented (e.g., antipodal signaling in acoustics could be represented by two different tones).

The invention may also be generalized for the case of non-Gaussian channels with a known probability density function and/or higher order modulation schemes.

Such variations are not to be regarded as departure from the spirit and scope of the exemplary embodiments of the present invention, and all such modifications as would be obvious to one skilled in the art are intended to be included within the scope of the following claims.

We claim:

1. A method of processing signals, comprising:
    receiving multi-path signals using a rake receiver;
    determining channel estimates using a channel estimation unit for the received multi-path signals;
    applying combining operation using a combination unit to the multi-path signals to obtain a received signal, the combining operation being a function of a correlation matrix of the received multi-path signals, a correlation matrix of estimates for channels of the received multi-path signals, and a cross-correlation matrix of the channels and channel estimates for the received multi-path signals; and wherein
    the correlation matrix of the received multi-path signals is a function of a correlation matrix of the received multi-path signal channels and a correlation matrix of noise on the received multi-path signal channels;
    the correlation matrix of estimates for channels of the received multi-path signals is a function of the correlation matrix of the received multi-path signal channels and a cross-correlation matrix between effective noise and channel estimation error; and
    the cross-correlation matrix of the channels and channel estimates for the received multi-path signals is a function of the correlation matrix of the received multi-path signal channels and a correlation matrix of error in the estimates for channels of the received multi-path signals.

2. The method of claim 1, wherein the cross-correlation matrix of the channels and channel estimates for the received multi-path signals is a function of the correlation matrix of the received multi-path signal channels and the cross-correlation matrix between effective noise and channel estimation error.

3. The method of claim 1, wherein the multi-path signals include at least one of correlated signals and uncorrelated signals.

4. The method of claim 1, wherein the multi-path signals are received in at least one of a rake receiver and an antenna/sensor array.

5. The method of claim 1, wherein the rake receiver includes multi-path clusters.

6. The method of claim 5, wherein the multi-path signals are uncorrelated signals, and the combining operation is a simple weighting function.

7. The method of claim 1, further comprising:
    assigning a cluster of fingers to one multi-path, the cluster including at least two fingers and each of the at least two fingers having a fixed offset from one another.

* * * * *